(12) United States Patent
Inagaki

(10) Patent No.: US 6,196,650 B1
(45) Date of Patent: Mar. 6, 2001

(54) SENSORLESS MOTOR DRIVING CIRCUIT HAVING A COMPARATIVE PHASE LOCK LOOP ARRANGEMENT

(75) Inventor: Koichi Inagaki, Chiba (JP)

(73) Assignee: Sony Corporation, Tokyo (JP)

( * ) Notice: Subject to any disclaimer, the term of this patent is extended or adjusted under 35 U.S.C. 154(b) by 731 days.

(21) Appl. No.: 08/542,884

(22) Filed: Oct. 13, 1995

(30) Foreign Application Priority Data

Oct. 17, 1994 (JP) .................................................... 6-276979

(51) Int. Cl.[7] .......................................................... H02P 7/00
(52) U.S. Cl. ............................................................... 312/439
(58) Field of Search .................................. 318/254, 439, 318/138, 646, 685

(56) References Cited

U.S. PATENT DOCUMENTS

| | | | |
|---|---|---|---|
| 4,912,378 | * | 3/1990 | Vukosavic .............................. 318/254 |
| 4,949,000 | * | 8/1990 | Petersen ............................. 318/254 X |
| 5,223,772 | * | 6/1993 | Carbolante ............................. 318/254 |
| 5,306,988 | * | 4/1994 | Carbolante et al. .................... 318/254 |
| 5,396,159 | * | 3/1995 | Kaneda ............................. 318/254 X |
| 5,428,284 | * | 6/1995 | Kaneda et al. ......................... 318/138 |
| 5,530,326 | * | 6/1996 | Galvin et al. .......................... 318/254 |

* cited by examiner

Primary Examiner—Jonathan Wysocki
(74) Attorney, Agent, or Firm—Ronald P. Kananen; Rader, Fishman & Grauer

(57) ABSTRACT

A sensorless motor driving circuit including a detection circuit for detecting a reference position for the rotating rotor based on an excitation coil induction voltage, a differential pulse generating circuit for generating a differential pulse using a detection circuit output signal, a phase-locked loop circuit capable of generating a clock pulse, having a phase comparator for comparing the differential pulse with the clock pulse after the clock pulse has been frequency divided, an activation pulse generator for counting the clock pulses and generating an activation pulse when the differential pulse is not generated within the duration of a prescribed number of counts, a latch circuit for generating a delayed pulse delayed by a prescribed amount from the reference position of the rotor by counting the clock pulses or by using the activation pulse, a generating circuit for generating conduction switching signals for the excitation coils based on the delayed pulse and a driver circuit for bringing about conduction in the excitation coils based on the conduction switching signal.

11 Claims, 5 Drawing Sheets

U-phase voltage waveform

SENSORLESS MOTOR DRIVING CIRCUIT HAVING A COMPARATIVE PHASE LOCK LOOP ARRANGEMENT

BACKGROUND OF THE INVENTION

1. Field of the Invention

The present invention relates to the improvement of a sensorless motor driving circuit.

2. Description of Related Art

Sensorless motor driving circuits for driving, for example, two-phase brushless motors are well known. These circuits for driving two-phase brushless motors use rotation detecting elements such as Hall elements and switch over the conduction of the driving current (conduction) in the excitation coils utilizing an induced voltage (counter-electromotive voltage) generated in the excitation coils.

These general sensorless motor driving circuits carry out conduction switching by detecting the induction voltage in the excitation coils and supplying a certain amount of delay with respect to the timing of the inversion of the polarity.

Spike voltages (fly-back voltages) generated at the time of conduction changeover are then removed with filters.

Further, if the motor rotor is not activated directly after conduction in the excitation coils, with the motor rotor already being in the stationary position (referred to as the reference position) that is intended, if an induction voltage for the excitation coils is not detected within a certain period of time, an activation pulse is generated and the conduction pattern is forcibly switched over.

These methods of providing a prescribed delay in relation to the timing with which the polarity inverts, providing filters for removing the spike voltages, and generating activation pulses, can be divided into analog methods and digital methods.

Circuits for the analog methods utilize CR time constants to put in phase delays, remove spike voltages and generate activation pulses. Circuits for the digital methods, on the other hand, almost all use microprocessors.

Use of the digital method is possible in systems where the circuit scale is large but is not viable in small-scale circuit applications because of the cost of the microprocessors. It is therefore more natural for the analog method to be adopted, rather than the digital method.

However, in the analog method, it is necessary to set up the time constants for each element of the CR time constant circuit in the most appropriate manner, but this proves to be difficult due to interference between the time constants for each element. Further, a large number of resistors and capacitors are necessary, which means that a large number of parts are required.

SUMMARY OF THE INVENTION

As the present invention sets out to resolve the aforementioned problems, it is the object of the present invention to provide a sensorless motor driving circuit where the number of external parts is fewer when compared with circuits structured using the analog method, where the cost is reduced and where the most appropriate drive current switching is carried out for the excitation coils regardless of the rotational speed of the motor.

A sensorless motor driving circuit therefore comprises a detection circuit for detecting a reference position for the rotating rotor based on an excitation coil induction voltage, a differential pulse generating circuit for generating a differential pulse using a detection circuit output signal, a phase-locked loop circuit capable of generating a clock pulse, having a phase comparator for comparing the differential pulse with the clock pulse after the clock pulse has been frequency divided, an activation pulse generator for counting the clock pulses and generating an activation pulse when the differential pulse is not generated within the duration of a prescribed number of counts, a latch circuit for generating a delayed pulse delayed by a prescribed amount from the reference position of the rotor by counting the clock pulses or by using the activation pulse, a generating circuit for generating conduction switching signals for the excitation coils based on the delayed pulse and a driver circuit for bringing about conduction in the excitation coils based on the conduction switching signal.

The sensorless motor driving circuit may also be further equipped with a mask signal generator for generating, by counting the clock periods, a period for suppressing an imitation pulse generated during conduction changeover.

The PLL circuit controls the amount of delay for the latch delay circuit and the imitation pulse suppression period for the mask signal generator in response to the rotational speed of the rotor.

The motor of the present invention may be a two-phase bi-directional sensorless motor used for rotating a rotating drum of a rotating magnetic head device.

The motor of the present invention may also be a two-phase bi-directional sensorless motor used for rotating an optical disc.

According to this structure, the detector 3 detects the reference position of the rotor R based on the induction voltage of the excitation coils 1 and 2.

When the rotor R rotates, an alternating current voltage is induced in the coil. However, the reference position is the position of the rotor R when the alternating current voltage is zero volts.

A magnetic force is exerted on the rotor R when either of the excitation coils 1 or 2 conducts and the rotor R will rotate. When the rotor R rotates, counter-electromotive voltages 6s-2 and 6s-4 are detected at the detector 3.

The differential pulse generator 7 generates a differential pulse 7s using the output signals 3s-1 and 3s-2 from the detector 3. The phase comparator 40 of the PLL circuit 8 capable of generating the clock 8s compares the differential pulse 7s with a pulse 8p, which is the frequency-divided version of the clock 8s.

The latch delay circuit 9 generates a delayed pulse 9s delayed by a prescribed amount from the reference position of the rotor R by counting periods of the clock 8s. The circuits 6 and 12 generate conduction-switching signals 13s-1 through to 13s-4 for the excitation coils 1 and 2 based on the delay pulse 9s and the excitation coils 1 and 2 are forcibly switched over to the next conduction pattern.

In the above way, when the rotor R is rotating due to conductions, if the rotor R is already under the influence of magnetic force and is in the position (neutral position) at which it is intended to be stopped, the rotor R is at the reference position. The rotor R will therefore not move even if there is conduction in the excitation coils 1 and 2 and an induction voltage will not be generated. In this case, the activation pulse generator 10 counts the clock periods of 8s and generates an activation pulse 10s when a differential pulse 7s does not occur for a prescribed number of count periods. The latch delay circuit 9 then generates a delay pulse 9s based on this activation pulse 10s. The circuits 6 and 12 then generate conduction switching signals 13s-1 through to 13s-4 and the excitation coils 1 and 2 are forcibly switched over to the next conduction pattern.

It is preferable for the mask signal generator 11 to generate a period T for suppressing the imitation pulse generated during conduction switching by counting the periods of the clock pulse 8s.

It is also desirable for the PLL circuit 8 to control the amount of delay of the latch delay circuit 9 and the imitation pulse suppression period T of the mask signal generator 11 in response to the rotational speed of the rotor R.

DETAILED DESCRIPTION OF THE PREFERRED EMBODIMENTS

First Embodiment

The following is a detailed description of the preferred embodiments of the present invention based on the attached drawings.

The embodiment described in the following is a specific appropriate example of the present invention. Various technically preferable limitations have therefore been attached, but the scope of the present invention is by no means limited in this respect and in particular is not limited in regards to the points listed in the following description.

Figure 1:
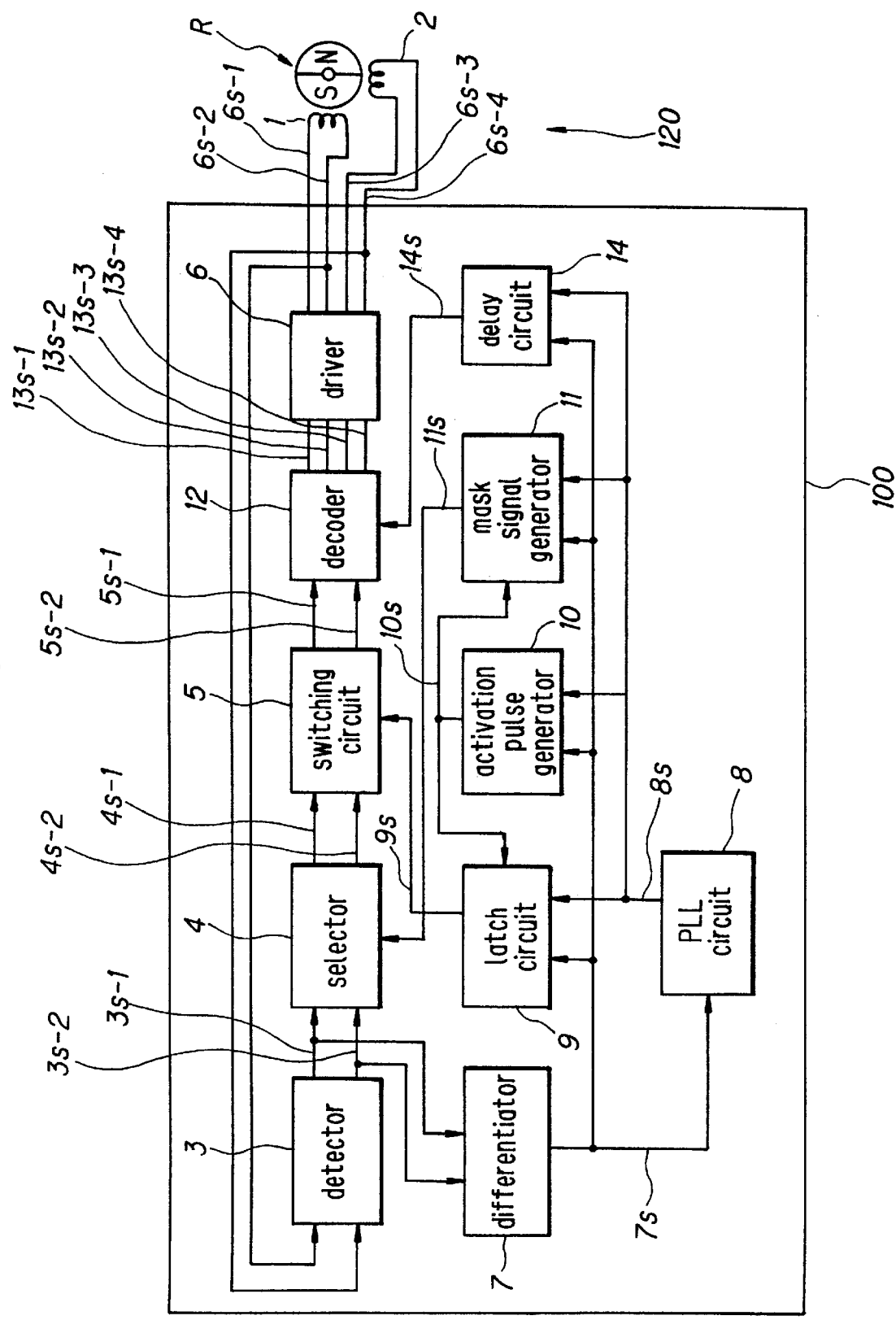
FIG. 1 is a block diagram showing a sensorless motor driving circuit of a first embodiment of the present invention.

FIG. 1 is a view showing a sensorless motor drive circuit for the first preferred embodiment of the present invention, with numeral 2 indicating a two-phase bi-directional excitation-type sensorless motor driving device.

In FIG. 1, a two-phase bi-directional sensorless motor (hereinafter referred to as a sensorless motor) 120 is driven by a sensorless motor driver 100.

This sensorless motor 120 may be used for rotating a magnetic drum for a rotating magnetic head device used, for example, with Video Tape Recorders (VTR's) etc. or as a motor for rotating optical discs in optical disc devices.

The sensorless motor 120 has two driving coils (hereinafter referred to as excitation coils) 1 and 2 and a rotor R. The rotor R has a north pole N and a south pole S. An induced voltage 6s-1 and an induced voltage (counter-electromotive voltage) 6s-2 are obtained from the excitation coil 1, with an induced voltage 6s-3 and an induced voltage (counter-electromotive voltage) 6s-4 being obtained from the excitation coil 2.

The sensorless motor driver in FIG. 1 is constructed from the following elements.

Counter-electromotive voltages 6s-2 and 6s-4 generated by the two-phase excitation coil 1 or excitation coil 2 due to rotations of the rotor R are taken by a detector 3 and a reference position for the rotor R is detected from the output of this detector 3.

When the rotor rotates, an alternating current voltage is induced in the coils, but the reference position of this rotor R is the position of the rotor R when this alternating current voltage becomes zero volts.

The detector 3 sends a comparator signal 3s-1 and a comparator signal 3s-2 to a selector 4 and a differential pulse generator 7 based on these counter-electromotive voltages 6s-2 and 6s-4. The selector 4 is connected to the driver 6 via a switching circuit 5 and a decoder 12.

The differential pulse generator of FIG. 1 is a differential pulse generating means, with a single differential pulse 7s being generated (for example, as referred to by the arrows F1 and F2 in FIG. 2) when either one of the comparator signals 3s-1 and 3s-2 is inverted. i.e. a differential pulse 7s is generated every time either of the counter-electromotive voltages 6s-2 and 6s-4 for the two-phase excitation coils 1 and 2 passes through zero. This differential pulse 7 is then inputted to a phase-locked loop (hereinafter referred to as PLL) circuit 8, latch delay circuit 9, activation pulse generator 10, mask signal generator 11 and delay 14.

Figure 2:
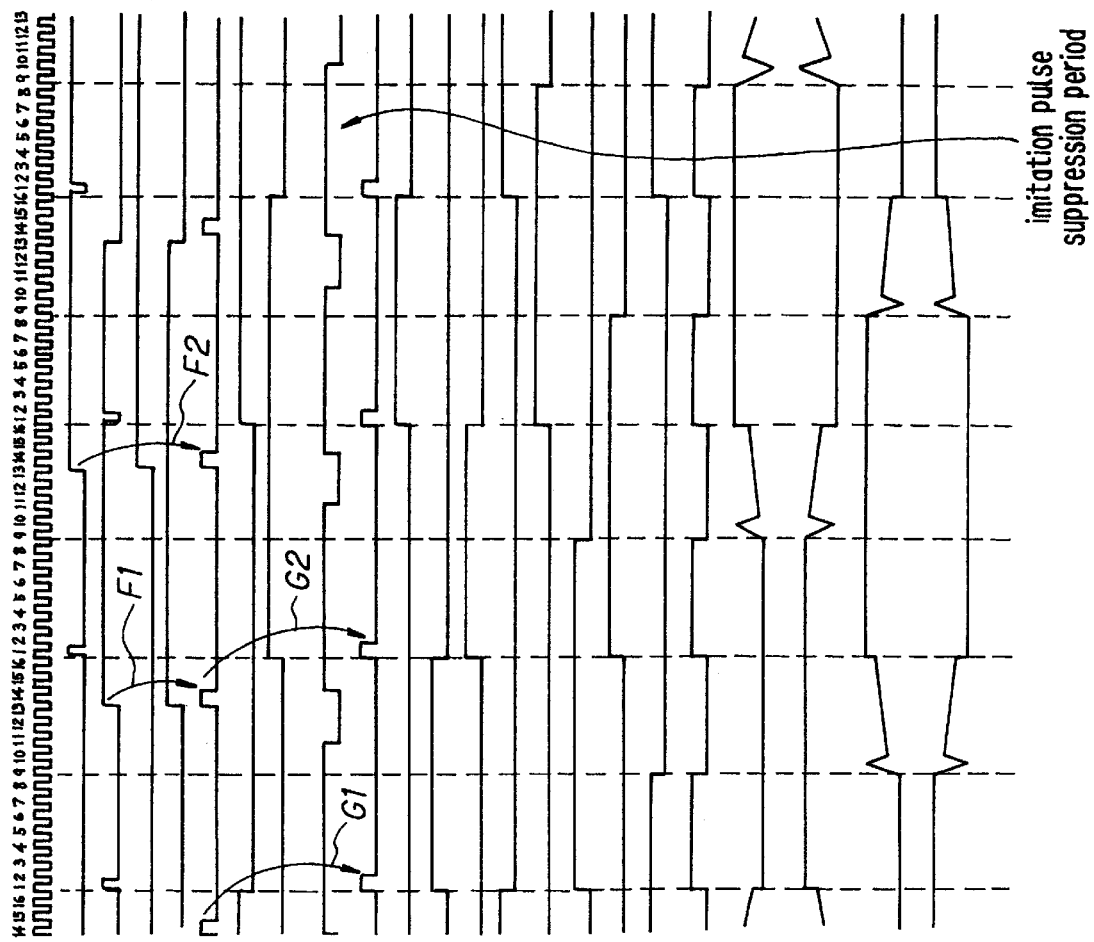
FIG. 2 is a timing diagram showing the timing of each of the signals for the sensorless motor driving circuit of FIG. 1.

The PLL circuit 8 of FIG. 1 is for generating with respect to the differential pulse 7s the sixteen times clock pulse signal 8s shown, for example, in FIG. 2. The PLL circuit 8 outputs the clock pulse 8s shown in FIG. 2 in synchronization with the differential pulse 7s.

Figure 3:
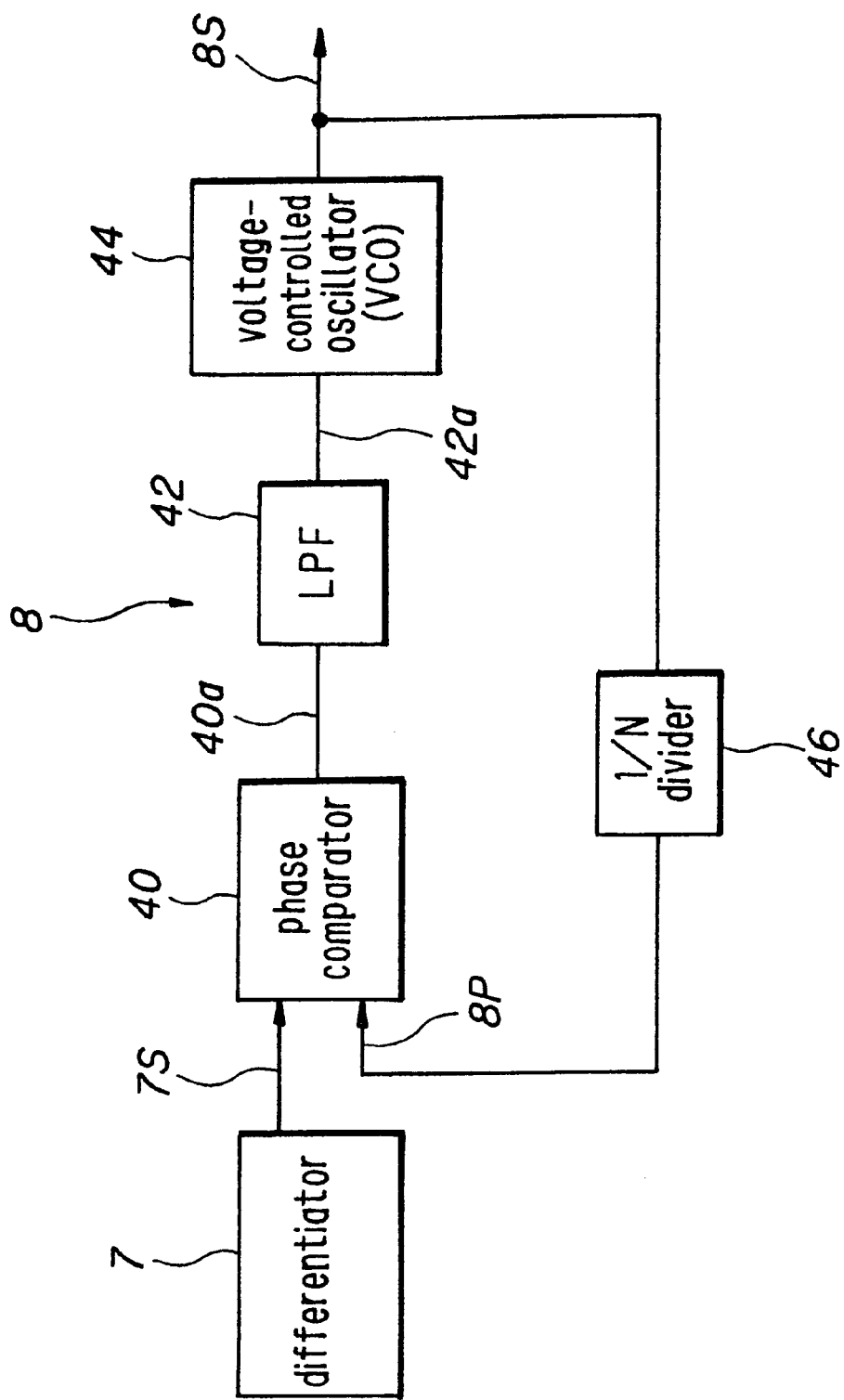
FIG. 3 is a view showing an example of the structure of the PLL circuit of FIG. 1.

FIG. 3 is a view of an example structure for this PLL circuit 8.

A phase comparator 40 takes the differential pulse 7s from the differential pulse generator 7 as input. The phase comparator 40 is connected to a voltage controlled oscillator (hereinafter referred to as a VCO) via a low pass filter (hereinafter referred to as an LPF) 42. The phase comparator 40 compares a pulse 8p (refer to FIG. 2) obtained by frequency dividing the clock pulse signal 8s outputted from the VCO 44 and a differential pulse 7s (refer to FIG. 2) outputted from the differential pulse generator 7 and then outputs the output 40a of FIG. 3.

The VCO 44 of FIG. 3 is connected to the phase comparator 40 via a 1/N frequency divider 46. The 1/N frequency divider divides the clock pulse signal 8s from the VCO 44 by 1/16 and provides a pulse 8p to the phase comparator 40.

The component of the frequency component for the output 40a which is below a fixed frequency passes through a low-pass filter 42. The VCO 44 is controlled by the output 42a of the low-pass filter 42 and a clock pulse signal 8s of a frequency corresponding to this output 42a is generated.

In this way, the VCO 44 generates a clock pulse signal 8s which is of a frequency which is, for example, 16 times that of the differential pulse 7s from the differential pulse generator 7. During this time, if the voltage of the output 42a of the low pass filter 42 is high, a high-frequency clock pulse signal 8s is outputted and if the voltage of the output 42a is low, a low-frequency clock pulse signal 8s is outputted.

Further, a latch delay circuit 9 (latch circuit) shown in FIG. 1 has an internal counter for counting the clock pulse signal 8s and generating, for example, 3 clock periods later, a latch delay pulse 9s from the differential pulse 7s from the differential pulse generator 7. This latch delay pulse 9s is a pulse delayed by a prescribed amount from the reference position of the rotor R.

Figure 4:
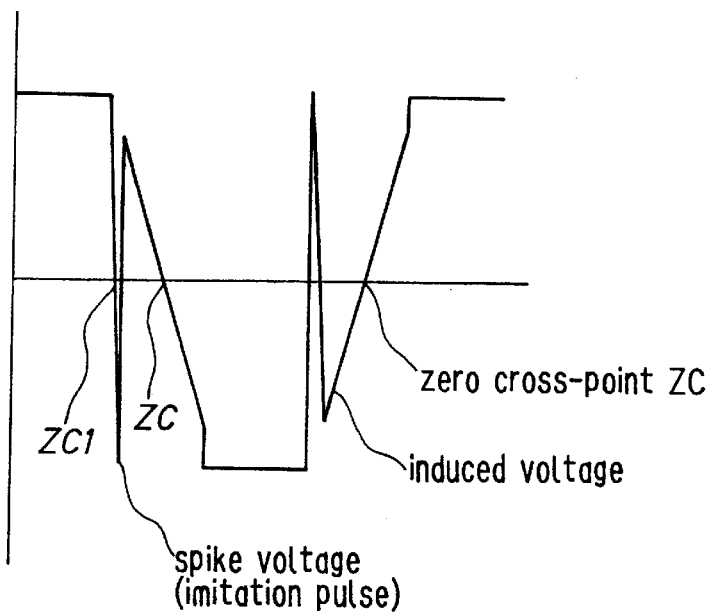
FIG. 4 is a view showing an example of conduction waveforms for a single driving circuit and an example of the fly-back voltage and zero cross point at the time of conduction changeover.

A mask signal generator 11 in FIG. 1 is set-up so that a mask signal 11s is on from the time of the differential pulse 7s being on until the latch delay pulse 9s has passed and a prescribed number of clock periods have elapsed. With regards to the excitation waveforms for the kind of U-phase (of the two phases, one is taken to be a U-phase and the other is taken to be a V-phase) excitation coil 1 shown in FIG. 4, this mask signal generator 11 is for preventing the kind of signals for the zero cross-point ZC1 for voltage spikes generated as a result of switching of the current flowing in the coil 1 from being inputted to the logic circuits of the selector 4 in FIG. 1. The signal for this zero cross point ZC1 is a signal, the generation of which does not depend on the rotation of the sensorless motor. An imitation pulse suppression period T for the mask signal generator 11 is a period for suppressing an imitation pulse (the spike voltage shown in FIG. 4) generated during conduction changeovers between the excitation coils 1 and 2.

The activation pulse generator 10 shown in FIG. 1 counts the number of clock pulse signals 8s from the PLL circuit 8 and generates an activation pulse 10s in place of the differential pulse 7s if the differential pulse 7s is not generated for a preset number of clock periods.

The activation pulse 10s drives the latch delay circuit 9 and the mask signal generator 11, with the latch delay circuit 9 and the mask signal generator 11 operating based on this activation pulse 10s in the same way as when the differential pulse 7s is generated.

The delay 14 outputs the delay signal 14s shown in FIG. 1 to the decoder 12 based on the differential pulse 7s from the differential pulse generator 7 and the clock pulse signal 8s from the PLL circuit 8.

Figure 5:
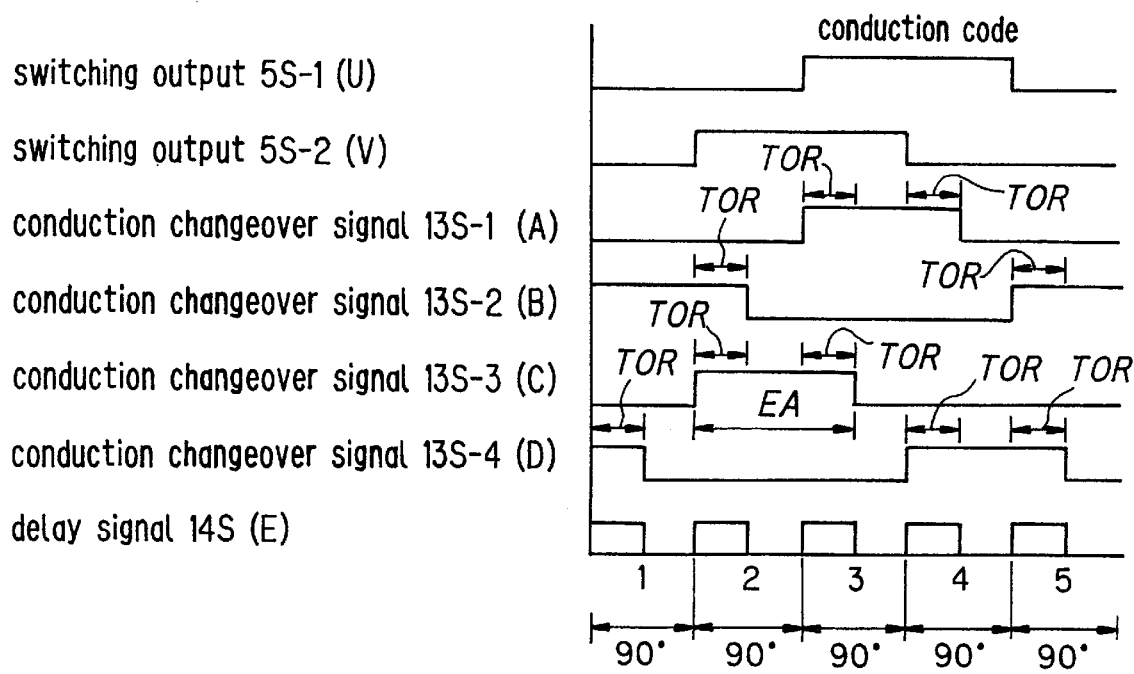
FIG. 5 is a view showing the conduction code of the logic circuit for the decoder of FIG. 2.

This delay signal 14s sets up an overlap period TOR for the conduction switching signals 13s-1 through to 13s-4 for the excitation coils 1 and 2 shown in FIG. 5. In this way, there is a delay between one phase (excitation coil 1 or 2) going on and the other phase (excitation coil 2 or 1) going off so that overlap conduction is carried out.

Specifically, the conduction switching signal 13s-2 (B) goes on, the logical product of the conduction switching signal 13s-3 (C) and the delay signal 14s is taken at the time the following conduction switching signal 13s-3 (C) goes on and the conductive switching signal 13s-2 (B) continues to be on. If the delay signal 14s then goes off, the conduction switching signal 13s-2 (B) goes off at the same time. During this time, the conduction switching signal 13s-2(B) and the conduction switching signal 13s-3 (C) overlap and conduct.

The electrical conduction angle EA of each of the phases included in the overlap period TOR is, for example, 135°. This conduction overlap is for achieving increased torque at the time of accelerating or decelerating when the rotor R is activated. Then, when the rotor R has reached a specified number of rotation, the providing of the delay signal 14s to the decoder 12 is halted, the overlap conduction is stopped and a usual electrical conduction angle of 90° is changed over to.

The delay signal 14s (E) is on for a prescribed period of time at the time of switching. For example, the delay signal 14s (E) is delayed from the zero cross point of the inductive voltage (ideally by 45°) and outputted. The ideal situation is if the latch delay signal 9s is faster than the latch output by half of the duration of the delay signal 14s.

This kind of conduction overlap is utilized in, for example, CD-ROM's etc. in order to increase the torque so that the access time may be reduced.

Next, the data flow for the conduction of the driving current for the excitation coils 1 and 2 is described.

The comparator signals 3s-1 and 3s-2 inputted to the selector 4 of FIG. 1 pass straight through the selector 4 when the mask signal 11s of the mask signal generator 11 is off. When the mask signal 11s is on, the data directly before the mask signal 11s goes on is latched and outputted to the switching circuit 5 as the select data signals 4s-1 and 4s-2.

The select data signals 4s-1 and 4s-2 are latched at the switching circuit 5 on the latch delay pulse 9s. i.e. the select data signals 4s-1 and 4s-2 are latched, for example, three clock periods after the differential pulse 7.

Figure 6:
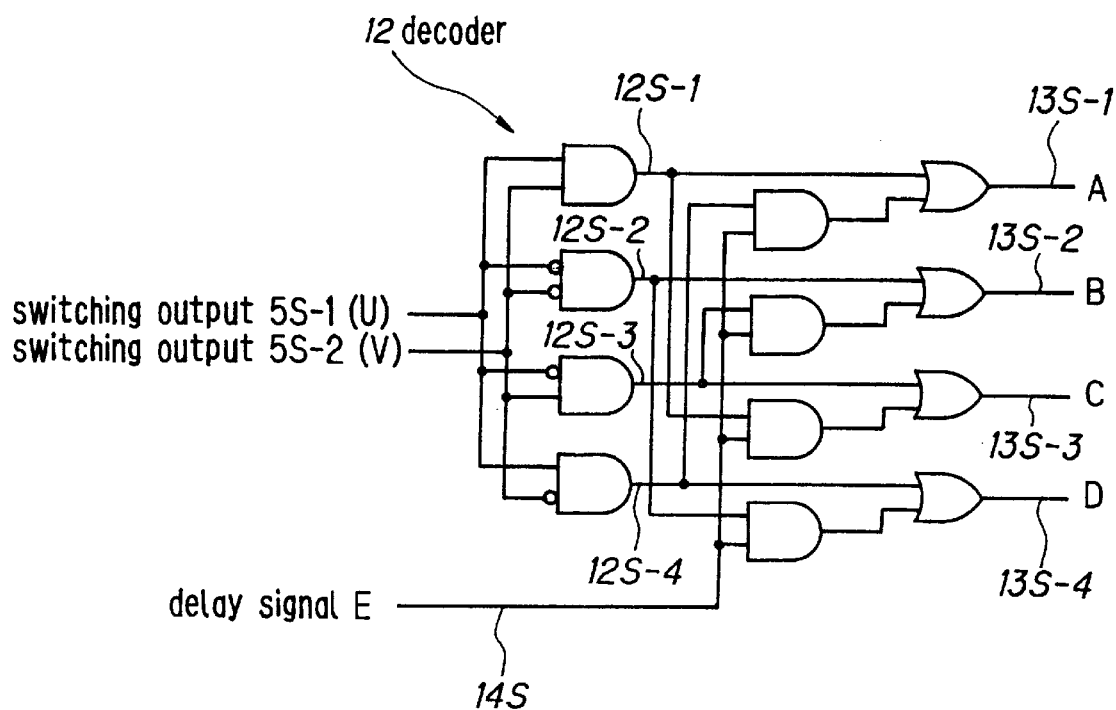
FIG. 6 is a view showing the logic circuit for the decoder of the sensorless motor driving circuit of FIG. 1.

The switching output 5s-1 (corresponding to the Uphase) and 5s-2 (corresponding to the V phase) in FIG. 6 are decoded based on the logic circuits of the decoder 12 in accordance with a conduction code and sent to the driver 6 of FIG. 1 as the conduction switching signals 13s-1 to 13s-4.

The driver 6 of FIG. 1 then switches over using a transistor not shown in the drawings, carries out the kind of phase changeover shown in FIG. 5 and causes the excitation coils 1 and 2 of FIG. 1 to conduct.

In this way, the flow of data for making a series of excitation coils 1 and 2 conduct may be controlled within a sensorless motor driver 100 taking the clock pulse signal 8s generated from the PLL circuit 8 as a reference.

Next, the operation of the sensorless motor driving circuit 100 of FIG. 1 will be described.

(1) When the rotor R is rotating during conduction.

When there is conduction with respect to the sensorless motor driver 100 and the rotor R of FIG. 1 is rotating, a driving current is flowing through one or other of the two excitation coils 1 and 2. If one or other of the excitation coils 1 or 2 conducts, the rotor R will be attracted by, for example, the magnetic force of the excitation coil 1 if this is conducting and the rotor R will rotate slightly. In doing so, the detector 3 will detect the induction voltage of the excitation coil 1 as described previously. An example of the waveforms for the counter-electromotive voltages 6s-2 and 6s-4 is shown in FIG. 2.

The detector 3 of FIG. 1 then detects these counter-electromotive voltages 6s-2 and 6s-4 and outputs the comparator signals 3s-1 and 3s-2. The differential pulse generator 7 then generates the differential pulse 7s of FIG. 2 based on these comparator signals. This differential pulse 7s is then supplied to the PLL circuit 8, the latch 9, the activation pulse generator 10, the mask signal generator 11 and the delay 14. The selector 4 then generates selector data signals 4s-1 and 4s-2.

The PLL circuit 8 of FIG. 1 then generates a clock pulse signal 8s at the lowest frequency and this clock pulse signal 8s is supplied to the latch delay circuit 9, driving pulse generator 10, mask signal generator 11 and delay circuit 14.

The latch delay circuit 9 and the mask signal generator 11 operate based on this differential pulse 7s and the latch delay circuit 9 generates a latch delay pulse 9s. At the switching circuit 5, this latch delay pulse 9s latches the selector data signals 4s-1 and 4s-2 a prescribed number of clock periods, for example, 3 clock periods after the differential pulse 7. The output of the switching circuit 5 is therefore forced into changing over to the next phase by the select data signals 4s-1 and 4s-2.

The result of the switching outputs 5s-1 and 5s-2 being forced to change over to the next phase by this latch delay pulse 9s is that the conduction switching signals 13s-1 to 13s-4 are supplied to the driver 6 by the decoder 12, the excitation coils 1 and 2 conduct and the rotor R rotates. When the rotor R starts to rotate, the aforementioned series operation is repeated and the rotation of the rotor R speeds up. At the same time, the speed with which the induced voltages shown in FIG. 2 pass through the zero cross point ZC increases and the intervals between the generation of the differential pulse 7s shown in FIG. 2 become shorter.

(2) When rotation due to conduction does not start with the rotor R already in a stationary position at the time of conduction.

If, after the excitation coils 1 and 2 conduct, the rotor R is temporarily attracted and is already in the stationary position which is intended, the rotor R does not move, while at the same time, the induced voltages 6s-1 and 6s-3 and the counter-electromotive voltages 6s-2 and 6s-4 are not generated.

Even when the rotor R does not move even with conduction, the PLL circuit 8 in FIG. 1 still generates a clock pulse signal 8s at the lowest frequency. This clock pulse 8s is then supplied to the latch delay circuit 9, the drive pulse generator 10, the mask signal generator 11 and the delay circuit 14.

The activation pulse generator 10 receives and counts this clock pulse signal 8s and generates an activation pulse 10s for taking the place of the differential pulse 7s when this count reaches a preset number. This activation pulse 10s is then supplied to the latch delay circuit 9 and the mask signal generator 11.

The latch delay circuit 9 and the mask signal generator 11 are driven based on this activation pulse 10s and the latch delay circuit generates a latch delay pulse 9s. This latch delay pulse 9s then latches the select data signals 4s-1 and 4s-2 at the switching circuit 5. The output of the switching circuit 5 is then forced to change over to the next phase by the select data signals 4s-1 and 4s-2.

The result of the switching outputs 5s-1 and 5s-2 being forced to change over to the next phase by this latch delay pulse 9s is that the conduction switching signals 13s-1 to 13s-4 are supplied to the driver 6 by the decoder 12, the excitation coils 1 and 2 conduct and the rotor R rotates. When the rotor R starts to rotate, the aforementioned series operation is repeated and the rotation of the rotor R speeds up. At the same time, the speed with which the induced voltages shown in FIG. 2 pass through the zero cross point ZC increases and the intervals between the generation of the differential pulse 7s shown in FIG. 2 become shorter.

With the embodiment of the present invention described above, because the number of externally attached parts is reduced when compared with conventional analog driving circuits, costs may be reduced, as may the number of mounting processes.

Further, in this embodiment of the present invention, an increase in torque of, for example, 30% can be achieved by carrying out overlapping conduction using a conduction angle of greater than 90° per each excitation coil phase to achieve the necessary increase in torque at, for example, the time of start-up. This embodiment of the present invention is therefore most suited to CD-ROMs (Read-only memory compact discs) etc. However, applications in power saving may also be possible because this embodiment of the present invention is little influenced by torque ripple when the rotor is rotating at a constant speed at an increased torque.

When this embodiment of the present invention is compared with conventional analog driving circuits, the timing is stable and changes in timing are carried out using logic. Therefore, with respect to installation, changes in the timing so as to be in line with the mode may be made easily even after mounting.

With this embodiment of the present invention, the most appropriate driving current switching is always carried out regardless of the rotational speed of the motor rotor R.

Further, a phase delay may be made using the latch delay circuit 9 so that a delay may be provided in the timing at which the polarity of the sensorless motor 120 inverts and the conduction may be switched over.

This embodiment of the present invention also employs a mask signal generator 11 that may be used to mask and therefore prevent spikes during periods when spike voltages are generated when conduction changeover takes place at the excitation coils 1 and 2. This eliminates mistaken detection of zero cross-points generated due to these spike voltages.

Moreover, in the case where the rotor R is not driven directly after conduction in the excitation coils 1 and 2, if an induction voltage is not detected within a certain period of time, the activation pulse generator 10 generates an activation pulse 10s in place of the differential pulse 7s and the excitation coils 1 and 2 are forced to change over to the next conduction pattern.

All of these elements are constructed as a data circuit within a single sensorless motor driving circuit 100.

Second Embodiment

Figure 7:
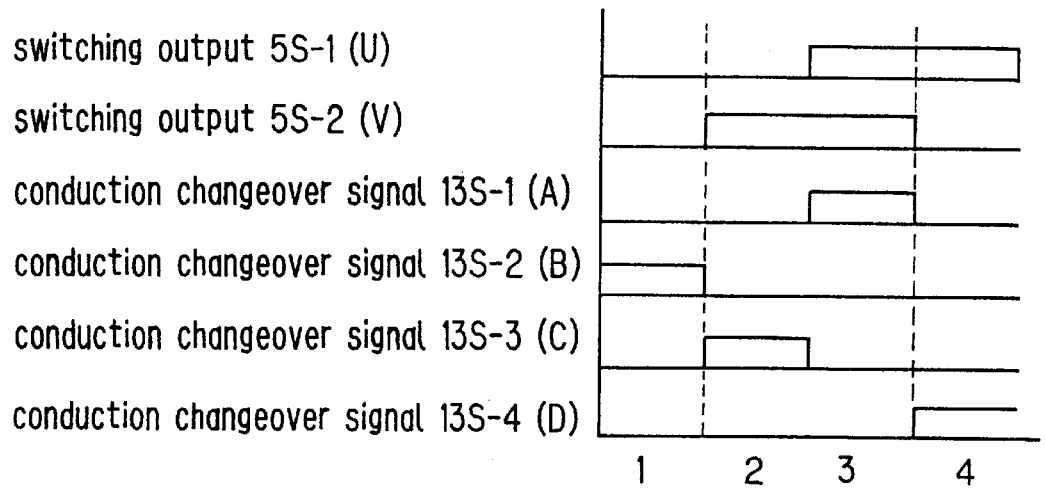
FIG. 7 is a view showing conduction code for logic circuits for the decoder of a second embodiment of the present invention.

Next, a second embodiment of the present invention is shown in FIG. 7. The embodiment in FIG. 7 differs with regards to the decoder conduction code.

With the conduction code for the decoder logic circuit of the embodiment in FIG. 5, the delay signal 14s sets up the overlap period TOR with respect to the conduction changeover signals 13s-1 through to 13s-4 and has a delay from when one phase (excitation coil 1 or 2) goes on until the next phase (excitation coil 2 or 1) goes off, so that overlap conduction may be carried out.

With regards to this, with the conduction code for the decoder logic circuit in the embodiment in FIG. 7, the delay signal 14 of FIG. 1 is not present, a delay signal 14s is not supplied to the decoder 12 and an overlap period TOR is not set-up for the conduction switching signals 13s-1 through to 13s-4. In other words, as shown in FIG. 7, the four conduction-switching signals 13s-1 through to 13s-4 for the timing of the conduction are generated by combining data for the switching outputs 5s-1 and 5s-2 and overlapping conduction is not carried out.

If a current is made to flow in the forward direction of the excitation coil 1 of FIG. 1 by the conduction switching signal 13s-1, then a current is made to flow in the opposite direction by the conduction switching signal 13s-2. Further, if a current is made to flow in the forward direction of the excitation coil 2 of FIG. 1 by the conduction switching signal 13s-3, a current is made to flow in the opposite direction by the conduction changeover signal 13s-4.

The present invention is by no means limited to the aforementioned embodiments.

The sensorless motor driving circuit of the present invention is not limited to 2-phase motors and is also applicable to 3-phase sensorless motors. Moreover, the 2-phase motor may not just be a coreless motor or an iron-core-type motor as applications are also possible with PM-type spindle motors or HB (hybrid) type stepping motors.

What is claimed is:

1. A sensorless motor driving circuit, for driving a motor having a rotor and a plurality of excitation coils for the rotor, comprising:

detection means for detecting a reference position for the rotating rotor based on an excitation coil induction voltage;

differential pulse generating means, coupled to an output of said detection means, for generating a differential pulse using a detection means output signal;

a phase-locked loop circuit for generating a clock pulse, having a phase comparator for comparing the differential pulse with the clock pulse after the clock pulse has been frequency divided;

an activation pulse generator for counting the clock pulses and generating an activation pulse when the differential pulse is not generated within the duration of a prescribed number of counts;

a latch circuit for generating a delayed pulse delayed by a prescribed amount from the reference position of the rotor by counting the clock pulses or by using the activation pulse;

a generating circuit for generating conduction switching signals for the excitation coils based on the delayed pulse; and a driver circuit for bringing about conduction in the excitation coils based on said conduction switching signals.

2. A sensorless motor driving circuit according to claim 1, further equipped with a mask signal generator for generating, by counting the clock periods, a period for suppressing an imitation pulse generated during conduction changeover between said excitation coils.

3. A sensorless motor driving circuit according to claim 2, wherein the PLL circuit controls the amount of delay for the latch delay circuit and the imitation pulse suppression period for the mask signal generator in response to the rotational speed of the rotor.

4. A sensorless motor driving circuit according to claim 1, wherein the motor is a two-phase bi-directional sensorless motor used for rotating a rotating drum of a rotating magnetic head device.

5. A sensorless motor driving circuit according to claim 1, wherein the motor is a two-phase bi-directional sensorless motor used for rotating an optical disc.

6. A sensorless motor driving circuit, for driving a motor having a rotor and a plurality of excitation coils for the rotor, comprising:

detection means for detecting a reference position for the rotating rotor based on an excitation coil induction voltage;

differential pulse generating means, coupled to an output of said detection means, for generating a differential pulse using a detection means output signal;

a phase-locked loop circuit for generating a clock pulse, having a phase comparator for comparing the differential pulse with the clock pulse after the clock pulse has been frequency divided; and an activation pulse generator for counting the clock pulses and generating an activation pulse when the differential pulse is not generated within the duration of a prescribed number of counts.

7. A sensorless motor driving circuit according to claim 6, further comprising:

a latch circuit for generating a delayed pulse delayed by a prescribed amount from the reference position of the rotor by counting the clock pulses or by using the activation pulse;

a generating circuit for generating conduction switching signals for the excitation coils based on the delayed pulse; and a driver circuit for bringing about conduction in the excitation coils based on said conduction switching signals.

8. A sensorless motor driving circuit according to claim 7, further equipped with a mask signal generator for generating, by counting the clock periods, a period for suppressing an imitation pulse generated during conduction changeover between said excitation coils.

9. A sensorless motor driving circuit according to claim 8, wherein the PLL circuit controls the amount of delay for the latch delay circuit and the imitation pulse suppression period for the mask signal generator in response to the rotational speed of the rotor.

10. A sensorless motor driving circuit according to claim 6, wherein the motor is a two-phase bi-directional sensorless motor used for rotating a rotating drum of a rotating magnetic head device.

11. A sensorless motor driving circuit according to claim 6, wherein the motor is a two-phase bi-directional sensorless motor used for rotating an optical disc.

* * * * *